Patented Mar. 13, 1928.

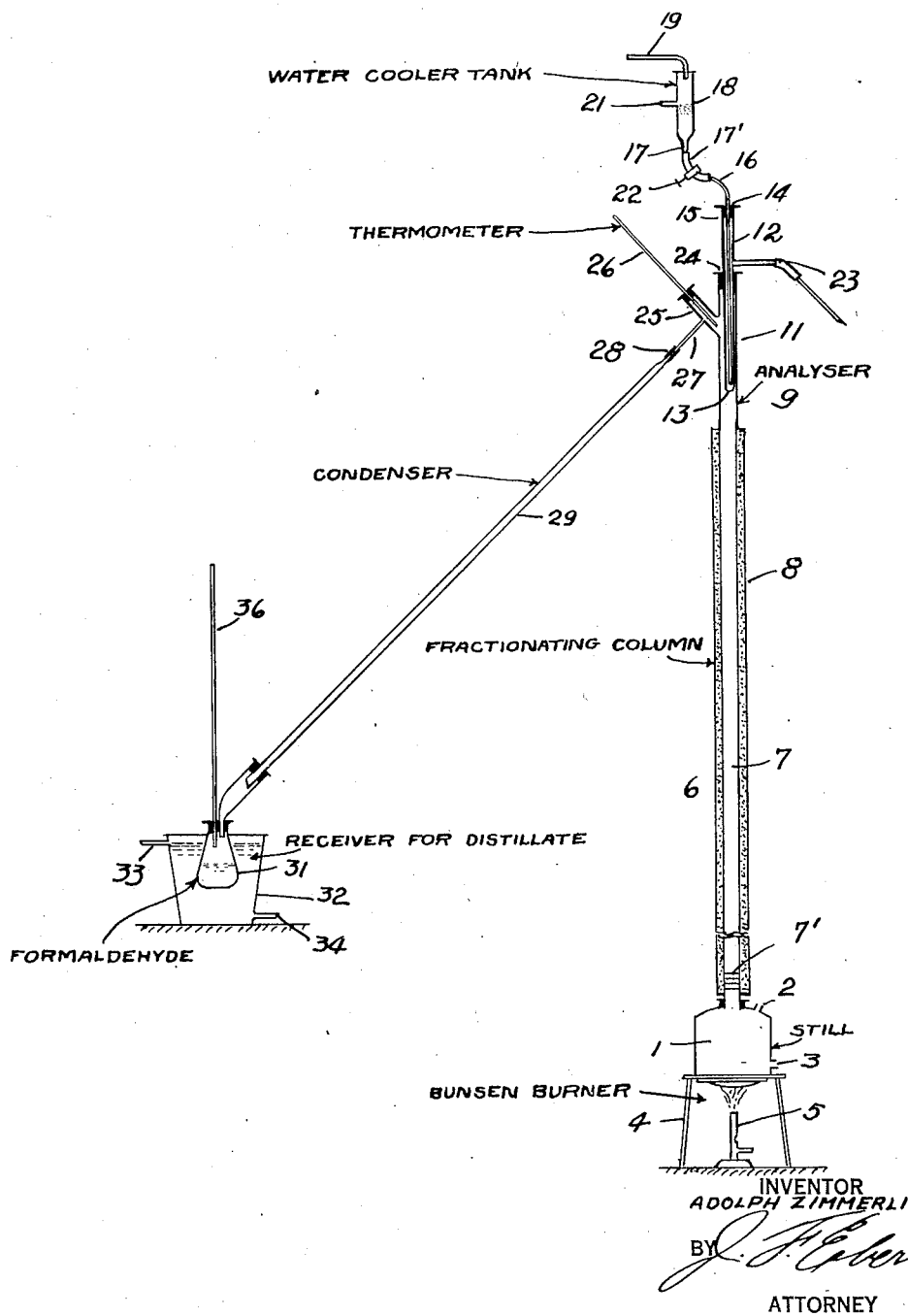

1,662,179

UNITED STATES PATENT OFFICE.

ADOLPH ZIMMERLI, OF NEW BRUNSWICK, NEW JERSEY.

PROCESS FOR CONCENTRATING FORMALDEHYDE SOLUTIONS.

Application filed January 28, 1924. Serial No. 689,052.

This invention relates to the preparation of formaldehyde, and more particularly to a process for obtaining strong formaldehyde solutions from weak solutions thereof, preferably by fractional distillation.

An object of my invention is to concentrate weak formaldehyde solutions by distillation.

Another object of my invention is to prepare strong formaldehyde solutions from weak solutions thereof by a process of fractional distillation.

Another object of my invention is to prepare commercial formaldehyde solutions by the distillation of weak formaldehyde solutions.

Still another object of my invention is to provide a process of fractional distillation whereby formaldehyde solutions of various percentages of concentration up to over 50% may be obtained from solutions containing less than 1% of formaldehyde.

A further object of my invention is to provide a process for distilling weak solutions whereby substantially all of the formaldehyde therein is recovered in the form of a concentrated solution.

A still further object of my invention is to provide a process for converting any weak formaldehyde solution into a stronger formaldehyde solution.

A still further object of my invention is to prepare a commercial formaldehyde solution from crude formaldehyde.

A still further object of my invention is to provide a process for simultaneously concentrating and purifying crude formaldehyde solutions.

A more specific object of my invention is to provide a process for distilling weak formaldehyde solutions and obtaining as the distillate a formaldehyde solution which is more than twice as concentrated as the original solution.

A still more specific object of my invention is to provide a process for converting substantially all of a weak formaldehyde solution into a strong formaldehyde solution, the latter being more than twice as concentrated as the original solution.

Other objects of my invention will be apparent as the description proceeds.

Many efforts have been made to prepare formaldehyde solutions of commercial strength (37-38% by weight) from weak solutions thereof. One of the methods which has been practised in order to accomplish this end was to fractionally distil a weak solution, but these efforts have always resulted in a distillate which is weaker than the original solution. Auerback in 1905 endeavored to accomplish the concentration of formaldehyde by distillation but was unsuccessful, and in view of his research as well as that of others in this field, it was generally accepted up to about the year 1921 that the behavior of formaldehyde in this respect is in contradiction with physical laws, for which no adequate explanation has been advanced.

Recently, however, Wilkinson and Gibson have found that stronger solutions of formaldehyde may be obtained by distilling weak solutions of formaldehyde, provided the original solution does not have a concentration greater than ten per cent of formaldehyde, for they found that with solutions stronger than that percentage the distillate always came over weaker than the original solution. These workers, however, although obtaining stronger solutions from weaker solutions when the concentration of the weaker solution did not exceed ten per cent, obtained a solution which was only approximately twice as strong as the original solution, the strength of the distillate obtained decreasing as the concentration of the original solution approached a concentration of ten per cent formaldehyde. Above ten per cent the distillate was always weaker than the residue.

Furthermore, the percentage by volume of the original solution obtained in the concentrated distillate was relatively small, in fact so small as to make the process commercially impractical. In addition the concentrated distillate obtained by Wilkinson and Gibson was of insufficient strength to be useful for commercial purposes as the customary commercial formaldehyde solutions are of a strength ranging well above the solutions these workers obtained, such commercial solutions being at the present time of an average strength of 37-38% by weight and running even as high as 55%, while the strength of the distillates obtained by Wilkinson and Gibson did not exceed ten per cent of formaldehyde.

It has also been proposed by Orloff in order to concentrate formaldehyde solutions that are not quite up to standard, to add 100% methanol to the weak solution and by distillation of this solution removing the methanol which would carry some water with it and thus leave as a residue a stronger formaldehyde solution.

It has been my experience, as well as the experience of others, that the foregoing processes are not satisfactory from a commercial standpoint, first because the distillation process, as previously practised, always resulted in obtaining a solution of lower concentration than the original solution or else the distillate if stronger than the original solution was of insufficient strength to be satisfactory from a commercial viewpoint. Furthermore, I have found with the process as given by Orloff, that the residue of strong formaldehyde usually becomes yellow during the concentration and is, therefore, below the commercial standard.

I have discovered that it is possible to obtain commercial solutions of formaldehyde from weak solutions and that this may be accomplished by fractional distillation of the weak solution, provided certain precautions are observed. I have further found that it is possible to distil weak solutions of formaldehyde of any concentration and always obtain a distillate of greater concentration, the difference in concentration between the original solution and the distillate being such as to furnish a distillate of commercial strength. Furthermore, I have discovered that by my process it is possible to distil substantially all of the formaldehyde and leave behind as the residue in the still nothing but water.

Furthermore, my invention, being applicable to the distillation of crude formaldehyde solutions, I am enabled to simultaneously concentrate and purify such solutions. By practising my method it is possible to obtain solutions of any desired strength up to over 50% from solutions containing less than 1% of formaldehyde.

Briefly stated, my invention comprises boiling a weak solution of formaldehyde in a still provided with an efficient fractionating column, refluxing the vapors and running them back into the still and continuing such action until an equilibrium is reached throughout the column, and then slowly distilling the formaldehyde.

For a more comprehensive understanding of my invention reference may be had to the accompanying schematic illustration of the apparatus employed by me in practising my process, as well as to the accompanying specific examples, which, it should be understood are given for illustrative purposes only and to comply with the patent statutes.

Referring to the drawing, an apparatus for practising my process may comprise a still 1 of any suitable material, such as aluminum, which may be provided with an inlet opening 2 through which the still may be charged, and an outlet opening 3 for removing the residual liquor. The still may be mounted on any convenient form of support, such as a standard or table 4 between the legs of which may be placed a suitable heating element, such as a Bunsen burner 5. Disposed above the still and connected thereto is a fractionating column 6 of any design built to give efficient fractionation. The fractionating column employed by me may consist of a glass tube 7, 1 inch in diameter, and filled with ¼ inch glass rings 7', about ¼ inch long. The column or head may be surrounded with insulation material 8. The upper end 9 of the column is provided with an analyzer or condenser 11 comprising a ½-inch copper tube 12 closed at one end 13 and having sealed at 14 in the other end 15 a copper tube 16, $\tfrac{3}{16}$ inch in diameter, extending to near the bottom of the copper tube 12. The other end 17 of the copper tube 16 is connected by means of a rubber tube 17' to a tank 18 in which a constant head of water is maintained by means of a water supply pipe 19 and an overflow pipe 21. A valve or pinch cock 22 is provided about the rubber tube to provide a ready means for regulating the condenser. An overflow pipe 23 is connected to the copper tube 12. The copper tube 12 is sealed in the upper end of the fractionating head and above the lower end 13 of the analyzer is a branch pipe 25 into which is inserted a thermometer 26 for reading the temperature of the distillate. This branch tube 25 is ½ inch in diameter and has connected thereto a downwardly projecting branch tube 27, ¼ inch in diameter, which is connected at 28 to a glass tube 29 of larger diameter, preferably ½ inch in diameter. This latter tube may be termed the air condenser and although I employ a condenser of this character, such construction has no deciding influence upon the process. I prefer an air condenser in order to keep the distilling solution hot, thereby preventing polymerization of the formaldehyde.

Disposed beneath the condenser tube 29 and connected thereto in any convenient manner is a glass receiver 31 in which the distillate is permitted to condense and accumulate. The receiver is preferably placed in tank of water 32 provided with an overflow pipe 33 and a water supply pipe 34 for the purpose of maintaining the distillate cool. The glass receiver 31 may be provided with a vent pipe 36 for obvious reasons.

Having specifically described the apparatus which I employ to practise my process, I will now proceed to describe the process and will use as one example the concentration of a 3% solution of formaldehyde into a 37.5% stable commercial solution.

After filling the still through the opening 2 with a solution of formaldehyde of a 3% concentration, heat is applied by means of the Bunsen burner 5. When the liquid in the still reaches the boiling point, the mixture of formaldehyde and water vapors rises in the fractionating head until it comes into contact with the analyzer or condenser 11. At the start until equilibrium is reached the water is kept flowing through the condenser at such a rate as to preferably totally condense the vapors and cause the same to run back into the still. This action, which may be termed refluxing, is continued until an equilibrium condition is reached throughout the column, which usually takes about ten minutes, although a longer or shorter period of time may be found desirable as practise dictates. It is well known that aqueous formaldehyde solutions consist of a very complex mixture of different molecular compounds. It has been shown, for example, that probably $CH_2O$, $(CH_2O)_2$ and $(CH_2O)_3$ exist together with hydrated compounds, such as $CH_2(OH)_2$ and that for certain temperatures and concentrations a definite equilibrium is reached after a more or less considerable length of time, regardless of the relative proportion of the compounds originally present. While at low temperatures, it takes days, the equilibrium is reached after a few minutes at the boiling point.

After the equilibrium condition is obtained throughout the fractionating column, the amount of water running through the condenser 11 is reduced and so regulated that a 43% formaldehyde solution distils over. This may readily be determined from the temperature indicated by the thermometer 26 and the barometric pressure which latter may be obtained by means of a barometer disposed in any suitable and convenient position in the room. At 760 mm. pressure, for example, the distillate has the above concentration at 96 degrees C. Depending on the efficiency of the column from 70 to 95% of the total formaldehyde will be obtained as strong solution. When it is not possible any more to get a distillate of this strength, the receiver is changed and a second fraction collected, until the temperature has reached 100 degrees C. and the specific gravity of the distillate has gone down to 1,000 indicating that pure water is distilling. The remainder of the formaldehyde is thereby collected in this second fraction which has an average strength of from 3 to 10% and may be added to the next distillation. The residue may then be removed from the still by means of the opening 3. This residue will be found to be substantially free from formaldehyde and may be discarded.

Inasmuch as the formaldehyde solution thus obtained has a strength greater than that usually required in commerce, I may reduce the concentration thereof by adding methanol, and in order to obtain a standard commercial solution of 37.5% I add about 8–10% methanol. The methanol also serves as a stabilizer and prevents the formaldehyde from polymerizing.

If the formaldehyde solution employed at the beginning of the process is crude, the more volatile constituents, which may be considered as impurities, may be separated by fractionation.

My process as above described is applied to obtaining strong solutions from weak and relatively pure solutions, but, as will be more fully appreciated hereinafter, the process is equally applicable to the treatment of crude formaldehyde solutions having a concentration of formaldehyde of 16.9% or solutions of higher or lower concentration.

In applying my method to the treatment of crude formaldehyde solutions, as for example such as may be obtained by practising the process disclosed in U. S. Patent 1,392,886, issued October 4, 1921 to Carlisle H. Bibb, I may proceed as follows. A crude formaldehyde solution, may be obtained by the Bibb process of oxidizing methane, and which has a brownish color and upon analysis shows 16.9% formaldehyde, is placed in a still such as illustrated in the drawing. The burner is so regulated that at the beginning all of the liquid returned to the still through the column, after the crude formaldehyde has been brought to the boiling point. After approximately ten minutes refluxing, the speed of the water running through the analyzer may be reduced so that a slow distillation takes place. Between the temperatures 40–50 degrees C. a small amount of liquid, comprising about 0.4% of the total charge and consisting of almost pure methylal, is fractioned off. The temperature then rises rapidly until it reaches 64 degrees C. when almost 100% methanol distills over. The distillate contains some traces of formaldehyde and forms about 4% of the original liquid. After substituting another receiver, a third fraction is collected when the temperature rises to about 70 degrees C., this fraction comprising the distillate between 70 degrees and 95 degrees C. This fraction is very small and consists of a mixture of methanol, formaldehyde and water. This fraction may be set aside to be added to the next batch of crude formaldehyde before distilling the same.

The rate of distillation may then be increased and the main fraction collected as a 43% formaldehyde solution at 96 degrees C.

This fraction is about 33% of the original liquid and contains 84% total formaldehyde. The next fraction is then collected when the temperature of the distilling solution begins to rise until it reaches 100 degrees C. The average strength of this distillate is 10% and it forms about 23% of the original liquid. It may be put aside to be added to the next batch of crude formaldehyde. The residue in the still then may be removed. This residue is about 40% of the original liquid and is of a brownish color and free from formaldehyde. It may be discarded.

To form a stable solution of commercial strength, I may add to the 43% formaldehyde distillate the proper amount of the fraction containing the almost pure methanol with a trace of formaldehyde.

Although I have defined a commercial solution as one consisting of from 37 to 38% formaldehyde and from 6 to 12% of methanol, it is obvious that other solutions up to 55% and even above that percentage with varying amounts of methanol may be used and be considered as commercial solutions. My process is capable of being practised to obtain solutions of this strength, and therefore, my invention as defined by the appended claims, may be considered as contemplating the same without departing from the spirit thereof.

What I claim is—

1. The process of preparing a stronger formaldehyde solution from a weaker solution which comprises refluxing the weaker solution until an equilibrium has been established between the formaldehyde and its polymers and hydrates, and then fractionally distilling the same.

2. The process of preparing a stronger formaldehyde solution from a weaker solution which comprises refluxing the weaker solution until an equilibrium has been established between the formaldehyde and its polymers and hydrates, fractionally distilling the same and recovering the formaldehyde fraction.

3. The process of preparing a stronger formaldehyde solution from a weaker solution which comprises refluxing the weaker solution until an equilibrium has been established between the formaldehyde and its polymers and hydrates, and then slowly distilling the same until the concentration of the formaldehyde fraction becomes less than that of the initial solution.

4. The process of preparing a stronger formaldehyde solution from a weaker solution which comprises refluxing the weaker solution until an equilibrium has been established between the formaldehyde and its polymers and hydrates, and then passing the vapors through an air condenser to prevent polymerization.

5. The process of preparing formaldehyde solutions containing up to over 50% formaldehyde, which comprises fractionally distilling a weak solution after having established an equilibrium between the formaldehyde and its polymers and hydrates.

6. The process of preparing formaldehyde solutions containing up to over 50% formaldehyde, which comprises refluxing a weak solution of formaldehyde until an equilibrium between the formaldehyde and its polymers and hydrates has been established, and then slowly distilling the formaldehyde solution until the concentration of the formaldehyde fraction becomes less than that of the initial solution.

7. The process of preparing strong formaldehyde solutions from weak solutions thereof, which comprises heating a weak solution of formaldehyde to the boiling point in a still having a fractionating column and an analyzer at its upper end, regulating the rate of flow of water through the analyzer so as to condense the vapors and cause them to run back into the still until an equilibrium has been established between the formaldehyde and its polymers and hydrates, then decreasing the condensing action and distilling the formaldehyde at about 96 degrees C.

8. The process of obtaining solutions of formaldehyde of any desired strength from weaker solutions, which comprises refluxing a weak solution of formaldehyde, and then fractionally distilling and collecting the formaldehyde fraction.

9. The process of preparing formaldehyde solutions of commercial strength from crude formaldehyde prepared by oxidation of a hydrocarbon which comprises refluxing the crude formaldehyde solution until an equilibrium is reached between the formaldehyde and its polymers and hydrates, distilling and collecting the fractions coming off at about 65 degrees C. and about 96 degrees C.

10. The process of preparing formaldehyde solutions from crude formaldehyde which comprises refluxing a crude formaldehyde solution for about ten minutes and then fractionally distilling and collecting the distillate which comes off at about 96 degrees C.

In testimony whereof, I have hereunto subscribed my name this 24th day of January, 1924.

ADOLPH ZIMMERLI.